2,891,888

3(2-CYCLOPENTENYL)-2-METHYL-4-OXO-2-CYCLOPENTENYL CHRYSANTHEMUMATE INSECTICIDE AND PROCESS OF MAKING IT

Howard R. Guest and Harry A. Stansbury, Jr., South Charleston, W. Va., assignors to Union Carbide Corporation, a corporation of New York No Drawing. Application June 23, 1953
Serial No. 363,688

7 Claims. (Cl. 167—30)

This invention relates to insecticides closely related to those found in pyrethrum flowers, *Chrysanthemum cinerariaefolium*. More particularly, it is concerned with 3-(2-cyclopentenyl)-2-methyl-4-oxo-2-cyclopentenyl chrysanthemumate as a new composition of matter. The structure of this ester, to which the name cyclethrin has been applied, can be represented graphically by the following formula:

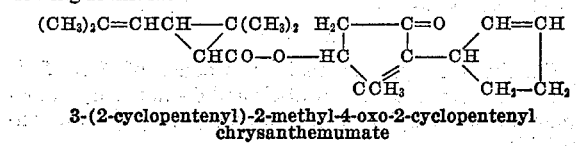

3-(2-cyclopentenyl)-2-methyl-4-oxo-2-cyclopentenyl chrysanthemumate

The invention is concerned also with the process of making the ester and with certain intermediates employed in the process, as new compositions of matter.

One of the largest uses for pyrethrum today is for the control of household pests such as flies, mosquitoes, moths, roaches, silverfish, and similar insects. Formulated, for instance, in petroleum oil it can be applied as a space spray or applied as an aerosol. In household sprays, for example, a recommended concentrate of pyrethrins (active ingredient of pyrethrum flowers) would contain the extract of twenty pounds of pyrethrum flowers to the gallon of solvent, such as petroleum oil distillate. This concentrate could then be diluted to a pyrethrin content of about 0.05 to 0.25 percent by weight for a household spray. Because of the high cost of pyrethrins and because the action of pyrethrins tends, at use levels, toward paralysis rather than outright killing, they are supplemented with rotenone, thiocyanates, DDT and related materials to provide kill. Such mixtures give both kill and knockdown.

Until the synthesis of allethrin in the laboratories of the Department of Agriculture, pyrethrum was unique in its rapid paralytic properties and freedom from hazard to mammalian organisms and the only material of its type which could be used to provide rapid knockdown (paralysis) of flies. Two of the active constituents of pyrethrum flowers are esters of substituted 3-methyl-2-cyclopenten-4-ol-1-ones and chrysanthemummonocarboxylic acid. In the procedure employed for the synthesis of allethrin, chrysanthemummonocarboxylic acid and 2-allyl-3-methyl-2-cyclopenten-4-ol-1-one are each prepared separately by a series of steps, followed by the formation of the ester from these two components. The following schematic equation is illustrative of the last step which is the formation of the ester:

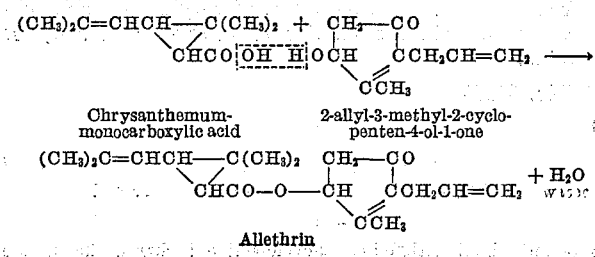

The application to this alcohol and this acid of conventional procedures for forming an ester, involving as they do elevated temperatures and long reaction periods, results in deterioration of the cyclopentenolone molecule and poor yields of allethrin. The process suggested by LaForge and others (J. Org. Chem., vol. 12, pp. 199–202 (1947); J. Chem. Soc., (1950) pp. 3552–63) employs the acid chloride made by the action of thionyl chloride upon the acid. The acid chloride in turn is reacted with the cyclopentenolone in the presence of pyridine to give allethrin. A number of difficulties over and above those arising out of the corrosive nature of the thionyl chloride and the noxious qualities of the sulfur dioxide and hydrogen chloride evolved are encountered in this final step of making allethrin. For instance, certain coproduct alcohol impurities present in the 2-allyl-3-methyl-2-cyclopenten-4-ol-1-one are also esterified by the acid chloride treatment. The resulting ester impurities in the allethrin are of low insecticidal activity and very difficult to remove from the allethrin. In addition, sulfur and chlorine compounds of unknown structure are formed and remain as impurities in the allethrin. In this connection, it is relevant to note that there is a definite disinclination on the part of the Federal Food and Drug Administration to allow more than traces of such impurities in material which is represented for use as a safe insecticide.

The difficulties and shortcomings of the acid chloride procedure have been obviated by the use of chrysanthemummonocarboxylic acid anhydride in the esterification step for the production of allethrin and other esters. This improvement is the subject of the copending application Serial No. 299,729, filed July 18, 1952, now U.S. Patent 2,768,965.

By reason of the numerous steps required for the synthesis of chrysanthemummonocarboxylic acid and 2-allyl-3-methyl-2-cyclopenten-4-ol-1-one, and also the complicated nature of the operations, allethrin is and is likely to remain a high cost chemical for use in household-type oil sprays. Currently, the price of allethrin is about three-fifths the price of pyrethrins. Pyrethrins and allethrin, by themselves, in household-type oil sprays are capable of kill, as well as knockdown of insects, such as flies and roaches, if used in sufficient amount. From a practical, economic viewpoint, this is too expensive. Although the annoyance from flies is removed for a time when they are no longer capable of flight, an amount of pyrethrins or allethrin sufficient to provide knockdown is not sufficient to kill. With roaches also, an amount of pyrethrins or allethrin insufficient to kill is sufficient to activate them so that they will come out into the open where they can be sprayed directly with chemical for a kill. To bring down the cost of the sprays, they have to be fortified either with another toxicant or killing agent, such as DDT or methoxychlor, for instance, or with a synergist to extend or broaden their action or both.

The scarcity of pyrethrum during World War II stimulated the search for and development of addition materials which would improve the efficiency of the pyrethrins. To these addition materials which, of themselves, have little or no value as insecticides, the terms activators, extenders, and synergists have variously been applied. One of the earliest synergists developed for pyrethrins is N-isobutylundecyleneamide introduced about 1938. Sesame oil of which the active ingredient, sesamin, was found to be a synergist for pyrethrins, was discovered (U.S. Patent 2,202,145; 1940) about this same time. The knowledge acquired about the structure of sesamin led to the synthesis of related compounds, such as "piperonyl butoxide," "piperonyl cyclonene," "n-propylisome," and "sulfoxide," which are the most commonly used pyrethrin synergists. Other less effective synergists are N-(2-ethylhexyl)-bicycloheptenedicarboxamide, polyoxypropylene glycol monobutyl ether of about 800 average molecular weight (viscosity, 240 to 260 S.U.S. at 100° F.), and the pinene ether of ethylene glycol.

As in the case of pyrethrum, efforts have been made to extend the insecticidal usefulness of allethrin. Although allethrin currently is not as costly as pyrethrum, on the other hand it is not capable of being as highly activated or synergized by the available pyrethrum synergists, as is pyrethrum.

Our new ester is more effective than are other pyrethrum replacements in activated or synergized compositions, as evaluated by standard tests against household pests, for instance. It is more effective also against ectoparasites of animals. In addition, it can be used to protect food products such as wheat and corn from insect attack. The number of chemicals available for this use is quite limited because of the dangers from residues left in the final food product consumed by humans and other animals. Because of the freedom of our new ester, cyclethrin, from mammalian toxicity, it can be used to advantage for these purposes.

The synthesis of our ester, cyclethrin, involves a number of steps, the reactions of which can be illustrated by the following scheme of equations:

STEP 1

Hydrogen chloride is caused to add to cyclopentadiene, which is a relatively inexpensive starting material, to form 2-cyclopentenyl chloride:

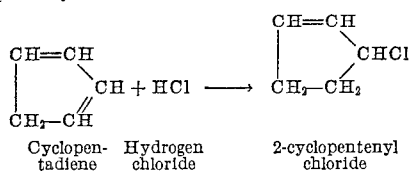

Cyclopen-   Hydrogen   2-cyclopentenyl
tadiene     chloride     chloride

STEP 2

2-cyclopentenylacetone is formed by the reaction of sodium acetoacetic ester with the 2-cyclopentenyl chloride from Step 1, followed by ketonic cleavage.

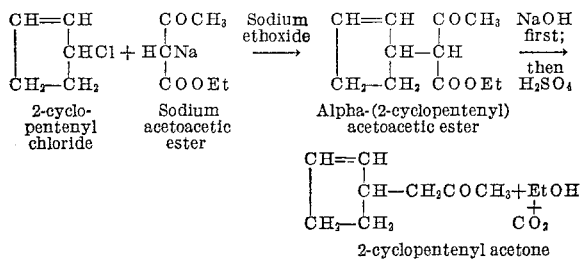

2-cyclo-    Sodium     Alpha-(2-cyclopentenyl)
pentenyl   acetoacetic   acetoacetic ester
chloride   ester 2-cyclopentenyl acetone

STEP 3

Ethyl 4-(2-cyclopentenyl)-3-ketobutyrate is made by reaction of diethyl carbonate with the 2-cyclopentenyl acetone product of Step 2.

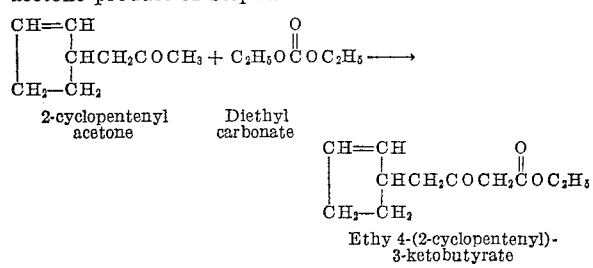

2-cyclopentenyl   Diethyl
acetone         carbonate

Ethy 4-(2-cyclopentenyl)-
3-ketobutyrate

STEP 4

Pyruvic aldehyde is reacted with the ethyl 4-(2-cyclopentenyl)-3-ketobutyrate product of Step 3 in the presence of dilute aqueous alkali metal hydroxide to form 6-(2-cyclopentenyl)-3-hydroxyhexane-2,5-dione. The ester is saponified to the sodium or potassium salt of the corresponding acid, which salt in turn condenses with the pyruvic aldehyde.

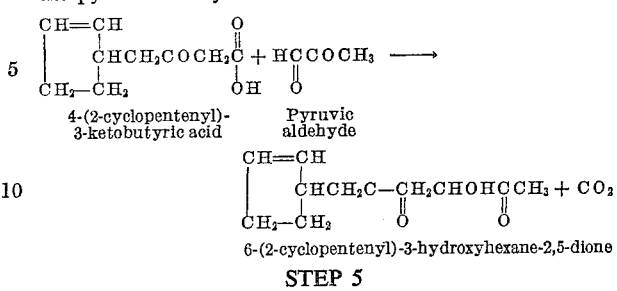

4-(2-cyclopentenyl)-   Pyruvic
3-ketobutyric acid    aldehyde 6-(2-cyclopentenyl)-3-hydroxyhexane-2,5-dione

STEP 5

The product of Step 4 is treated with dilute sodium hydroxide to form 2-(2-cyclopentenyl)-3-methyl-2-cyclopenten-4-ol-1-one.

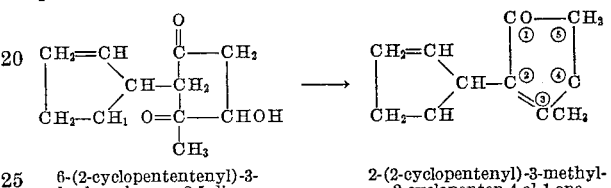

6-(2-cyclopententenyl)-3-   2-(2-cyclopentenyl)-3-methyl-
hydroxyhexane-2,5-dione    2-cyclopenten-4-ol-1-one

STEP 6

Finally, the cyclopentenolone product of Step 5 is treated to form the ester of dl-cis and dl-trans chrysanthemummonocarboxylic acid, preferably through the anhydride.

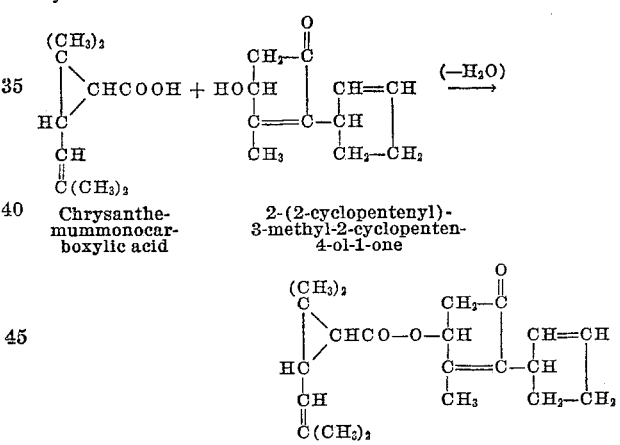

Chrysanthe-     2-(2-cyclopentenyl)-
mummonocar-   3-methyl-2-cyclopenten-
boxylic acid     4-ol-1-one Cyclethrin Cyclethrin is a mixture of isomers, including four racemic forms or eight optical and geometric isomers. These isomers have not yet been isolated and evaluated.

While it might be possible, on the basis of a graphic representation of structure, to regard our new ester as similar to allethrin except for a 2-cyclopentenyl group in a position corresponding to that occupied by an allyl group in allethrin, such a view would be an oversimplification, unwarranted by the facts. Even were it possible to employ allethrin as a starting material for the preparation therefrom of other compounds by the direct substitution of the allyl group, it does not follow that all of the products would exhibit the same useful biological activity. For instance, according to our studies and information, the following esters of chrysanthemummonocarboxylic acid are inferior in insecticidal activity or value:

(No. 6723)

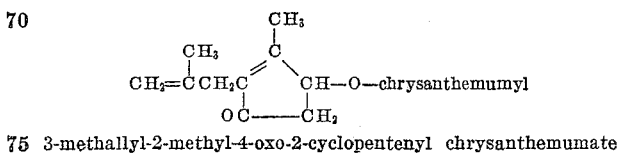

3-methallyl-2-methyl-4-oxo-2-cyclopentenyl chrysanthemumate (No. 6737)

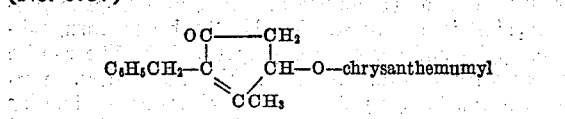

3-benzyl-2-methyl-4-oxo-2-cyclopentenyl chrysanthemumate (No. 6738)

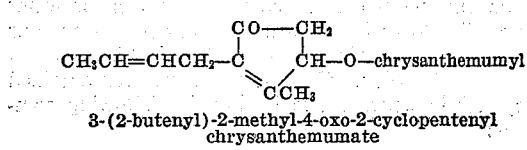

3-(2-butenyl)-2-methyl-4-oxo-2-cyclopentenyl chrysanthemumate (No. 6889)

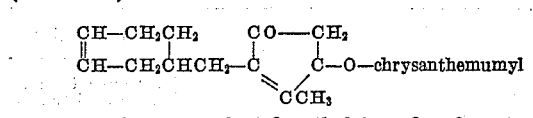

3-(3-cyclohexenylmethyl)-2-methyl-4-oxo-2-cyclopentenyl chrysanthemumate (No. 6979)

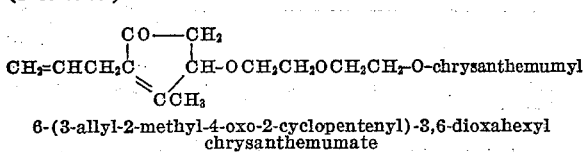

6-(3-allyl-2-methyl-4-oxo-2-cyclopentenyl)-3,6-dioxahexyl chrysanthemumate (No. 6980)

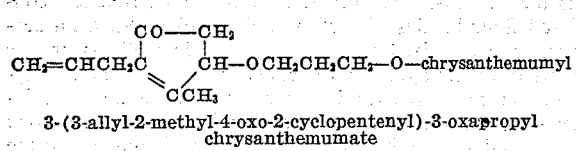

3-(3-allyl-2-methyl-4-oxo-2-cyclopentenyl)-3-oxapropyl chrysanthemumate

Biological testing of cyclethrin, unsynergized, reveals that it is of the same order of effectiveness as furethrin (3-furfuryl-2-methyl-4-oxo-2-cyclopentenyl chrysanthemummonocarboxylate), unsynergized; and that both are equal to allethrin, all unsynergized. It reveals also that those synergists which are superior in effectiveness with pyrethrin can also be used as synergists for cyclethrin. In general, slightly higher knockdown is obtainable with synergized pyrethrin than with cyclethrin synergized with the same synergists.

However, when synergized cyclethrin is compared with synergized allethrin only one-half as much cyclethrin is required with "sulfoxide" or with "n-propyl isome;" only one-third as much cyclethrin with "piperonyl butoxide" and only one-half to two-thirds as much with sesame oil extractives.

Another advantage of cyclethrin is that it is even less toxic to mammals on a direct concentration basis than is allethrin. According to one set of tests, undiluted cyclethrin (95.6 percent purity) has an LD–50 for rats in the neighborhood of 1.4 grams per kilogram as compared with 0.34 gram per kilogram for allethrin. According to another set of tests, the LD–50 for cyclethrin fed to male albino rats by intubation is 1.78 grams per kilogram. Fed as a dilution in Bayol D, the toxicity of cyclethrin is much less. For instance, at a concentration of 10 percent by weight in Bayol D, 3.98 grams per kilogram of cyclethrin killed only one of five rats while 2.0 and 1.0 gram per kilogram has allowed survival. Similarly, at a concentration of 20 percent by weight in Bayol D, the LD–50 for male albino rats is 4.9 grams per kilogram on the basis of the active ingredient.

For comparison, the LD–50 dose for diluted allethrin at a 10 percent concentration in Bayol D is 0.90 gram per kilogram and at a 20 percent concentration by weight in deodorized kerosene it is 0.92 gram per kilogram for male rats. According to these studies, cyclethrin seems to be of the order of about one-fifth as toxic as allethrin for rats in single oral doses on a direct concentration basis, and still less at actual use levels.

Compounds which are useful as synergists in combination with cyclethrin are:

A. Piperonyl butoxide which is a technical grade of the 3,4-methylenedioxy-6-propylbenzyl ether of diethylene glycol monobutyl ether having a structure as represented by the following graphic formula:

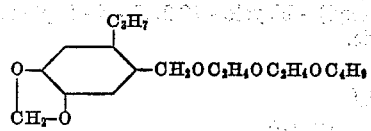

Compounds closely related to the above amount to about 20 percent by weight of the piperonyl butoxide.

B. Normal-propyl isome which is the name given to di - n - propyl - 2 - methyl - 6,7 - methylenedioxy - 1,2,3, 4-hexahydronaphthalene-3,4-dicarboxylate. Its structure can be represented by the following graphic formula:

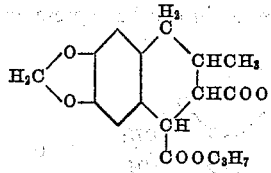

C. Synergist 6266 which is the number assigned to N - (hexoxyethoxypropyl) - bicyclo - [2.2.1] - 5 - heptene-2,3-dicarboximide having a structure as represented by the following graphic formula:

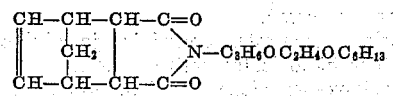

D. Sulfoxide which is the name given to the n-octylsulfoxide of isosophrole. It has a structure which can be graphically represented as follows:

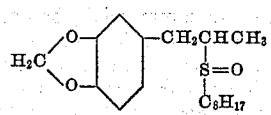

E. N-isobutyl undecylene amide, having the general formula $$CH_2=CH(CH_2)_8CONHC_4H_9$$

F. Pinene ether of ethylene glycol, having the empirical formula $$C_{10}H_{11}OCH_2CH_2OH$$

G. Piperonyl cyclonene, which is a mixture of 3-isoamyl - 5 - (3,4 - methylene dioxyphenyl) - 2 - cyclohexenone and its 6-carbethoxy derivative

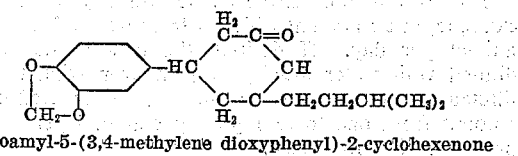

3-isoamyl-5-(3,4-methylene dioxyphenyl)-2-cyclohexenone

H. Butoxypolypropylene glycol which is the name given to polyoxypropylene glycol monobutyl ether having a viscosity of about 100 S.U.S. at 100° F. and an average molecular weight of about 800.

I. Sulfone, which is the name given to normal octylsulfone of isosaphrole.

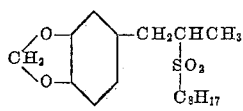

J. Synergist 264 which is the number assigned to N-(2 - ethylhexyl) - bicyclo - [2.2.1] - 5 - heptene - 2,3 - dicarboximide.

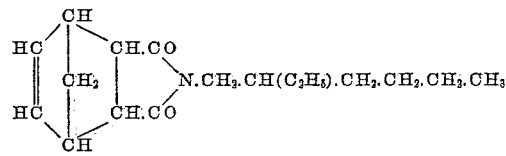

K. Sesame oil is the name given to the oil from *Sesamum indicium* of which about 0.25 percent is sesamin. The structure of sesamin can be represented graphically by the formula:

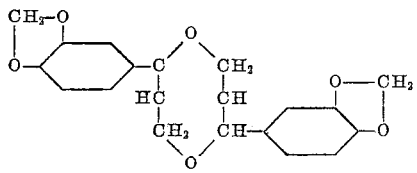

Of the eleven synergists named, sulfoxide and piperonyl butoxide are preferred.

Cyclethrin concentrates, containing in addition to cyclethrin other biologically active materials such as, for instance, polyoxypropylene glycol monobutyl ether having an average molecular weight of about 800 (known commercially as Crag brand fly repellant); beta-butoxybeta'-thiocyanodiethyl ether and a mixture of the beta-thiocyanoethyl esters of higher fatty acid having 10 to 18 carbon atoms (known commercially as Lethanes); terpene thiocyanoacetates (known as Thanite-Isobornyl Acetate); methoxychlor; and a synergist can be used to protect livestock from such ectoparasites as flies, lice and ticks. Illustrative of such a concentrate would be a formulation containing the ingredients in the following relative proportions by weight.

|  | Parts by Weight | |
|---|---|---|
|  | A | B |
| cyclethrin | 0.1 to 10 | 0.1 to 10 |
| polyoxypropylene glycol monobutyl ether (av. mol. wt. 800) | 20 to 80 | 20 to 80 |
| piperonyl butoxide | 2 to 20 | 2 to 20 |
| emulsifier | 0 to 20 | 0 to 20 |
| methoxychlor |  | 0 to 10 |

This formulation can be applied directly to cows, for example, in an amount which is from 0.5 to 2 grams per animal per day. If desired, the concentrate can be diluted with water usually in such proportion that the diluted concentrate, so called, can be sprayed in an amount from one to four pints per animal per week to protect against fly attack.

Furthermore, a concentrate as of the above formulation, either with or without emulsifier, can be diluted with petroleum distillate or water and be applied as space sprays for knockdown and kill of flies, moths and the like; or it can be applied to agricultural crops to protect against insect attack. Specifically, beans, corn, cabbage, apples and apple trees, grapes and the like can be protected from worms, beetles, aphids and spiders. Similarly, it can be sprayed on such surfaces as the interior of grain bins or elevators to kill insects attacking cereal grains, or it can be applied directly on cows or other livestock to protect against fly attack. Still further, these same concentrates when diluted either with oil or water can be applied to such packaged goods as cereals or flour in cloth or paper containers to protect against insect penetration and infestation. Good results have been obtained with cyclethrin concentrates having the following compositions:

|  | Parts by weight | |
|---|---|---|
|  | Formulation C | Formulation D |
| cyclethrin | 0.5 | 0.7 |
| piperonyl butoxide | 5 | 7 |
| Fly repellant ("Crag")[1] | 50 | 75 |
| emulsifier | 12 | 15 |
| petroleum distillate | 32.5 | 3.5 |
|  | 100.0 | 100.0 |

[1] Polyoxypropylene glycol monobutyl ether; aver. molecular weight about 800.

Cyclethrin with synergists and a propellant can also be used in aerosols or pressurized sprays to kill insects such as flies, moths, mosquitoes, bedbugs, ants, roaches, confused flour beetles, silverfish, and the like. Such an aerosol or pressurized spray can contain in addition one or more of the halogenated toxicants such as DDT, methoxychlor or Strobane, for instance, or thiocyanates or thiocyanoacetates and either with or without a solvent such as methylated naphthalenes, petroleum distillates and the like, if desired. Illustrative of a suitable aerosol or pressurized spray is the following formulation:

*Pressurized spray*

|  | Parts by weight |
|---|---|
| Cyclethrin | 0.01 to 6.0 |
| Synergist | 0.05 to 10.0 |
| Toxicant [1] | 0.0 to 6.0 |
| Polyoxypropylene glycol monobutyl ether [2] | 0.0 to 55.0 |
| Solvent propellant [3] to make a total of 100 parts by weight of spray. |  |

[1] DDT; methoxychlor; Strobane; thiocyanates; thiocyanoacetates.
[2] Viscosity at 100° C., 250 S.U.S.; av. mol. wt. 800.
[3] Freon 11; Freon 12.

Our new insecticide, cyclethrin, can also be used in dry formulations especially adapted for protection of cereal grains and flour against insect infestation in combination with inert dust-type carriers such as wheat flour, kaolin, talc, pyrophyllite, diatomaceous earth, kieselguhr, bentonite, ground walnut hulls, ground sawdust and the like. Illustrative of a suitable composition for this purpose is a formulation as follows:

*Grain protectant*

|  | Parts by weight |
|---|---|
| Cyclethrin | 0.02 to 0.5 |
| Synergist | 1.0 to 5.0 |
| Inert dust-type carrier, remainder to make 100 parts. |  |
| Total | 100.0 |

The following examples are illustrative.

EXAMPLE 1

*Part (a).*—Anhydrous hydrogen chloride was added to a mixture comprising 99 grams (1.5 mols) of monomeric cyclopentadiene in 380 grams of carbon tetrachloride. The mixture was maintained at a temperature of 0° C. during the addition which was continued for a period of about one hour until a gain in weight of about 58 grams was obtained. After the carbon tetrachloride had been distilled off at atmospheric pressure, there was obtained 138 grams (1.35 mols) of 2-cyclopentenyl chloride distilling at a temperatre of 52° C.–53° C. at an absolute pressure of 100 millimeters of mercury. The yield was 90 percent of theory.

*Part (b).*—Three hundred six grams of sodium ethoxide (4.5 mols) in the form of 1570 grams of a 19.5 percent solution in ethanol were added gradually to 650 grams (5 mols) of ethyl acetoacetate with stirring over a period of 30 minutes. The mixture was maintained at a temperature of 20° C. during the addition. After the mixture had been stirred for an additional period of one hour at 20° C., it was heated to a temperature of 50° C. and 459 grams of 2-cyclopentenyl chloride (4.5 mols) were added over a period of 1.5 hours. To complete the reaction, the mixture was maintained at its refluxing temperature at atmospheric pressure for a period of 3 hours. At the end of this time ethanol was removed from the mixture by distillation at atmospheric pressure to a kettle temperature of 125° C. The residue, which contained ethyl 2-cyclopentenyl-acetoacetate, was cooled to 20° C. and 2500 grams of aqueous sodium hydroxide (10 percent; 6.25 mols) were added over a period of 30 minutes. To complete the ketonic cleavage of the compound the mixture was stirred for a period of 4 hours while the temperature was maintained at 20° C. Next, 400 milliliters of aqueous sulfuric acid (50 percent) was added to reduce the pH of the mixture to 3.5. The mixture was treated with 200 milliliters of benzene and a distillation carried out at atmospheric pressure using a rectifying column fitted with a decanter of 175 milliliters capacity filled with benzene. During the distillation, a total of one liter of water was fed gradually into the vapor line just before the condenser. The lower layer in the decanter was continually removed while the oil in the decanter was returned as reflux to the still. This procedure was continued until the bead temperature reached 68° C. with the result that all of the ethanol was removed from the system while all the 2-cyclopentenylacetone product remained in the still.

Upon distillation of the oil in the residue, to which was added the oil in the decanter, there was obtained 440 grams of 2-cyclopentenyl acetone having the following properties: boiling range at an absolute pressure of 15 millimeters of mercury, 66° C. to 68° C.; specific gravity (20°/20°), 0.940. Analysis of the distilled product for ethyl acetoacetate by the sodium methoxide procedure gave a value of 8.3 percent by weight. Analysis for ketone by the hydroxylamine procedure gave a cyclopentenyl acetone content of 89.1 percent by weight after correction for the ethyl acetoacetate content. Because the boiling points of 2-cyclopentenyl acetone and ethyl acetoacetate lie very close, separation of the two compounds by fractional distillation is not readily accomplished. Upon removal of the ethyl acetoacetate from the 2-cyclopentenyl acetone, by saponification, the pure ketone had a specific gravity (20°/20°) of 0.934 and a refractive index ($n_D^{30}$) of 1.4543. The yield of 2-cyclopentenyl acetone was 72 percent based on the 2-cyclopentenyl chloride, corresponding to an efficiency of 72 percent.

*Part (c).*—Diethyl carbonate (2240 grams; 19 mols) was charged to a distillation kettle fitted with a refluxing condenser, and heated under a reduced pressure of 100 millimeters of mercury absolute at its refluxive temperature. Sodium ethoxide (185.6 grams; 2.73 mols) in the form of a 19.3 percent solution in ethanol (776.4 grams) was fed into the kettle over a period of 2 hours while ethanol was being continually distilled. The total distillate collected was 1033 grams. After all the ethanol solvent had been removed, leaving a suspension of sodium ethoxide in the diethyl carbonate in the still kettle, 340 grams of 2-cyclopentenyl acetone (purity, 91.7 percent; 2.51 mols) were fed over a period of two hours while the distillation was continued as before to remove ethanol. The total amount of distillate removed in this step was 289 grams. The residue was then cooled to 25° C., acetic acid (174 grams; 2.9 mols) added, which was followed by the addition of 620 milliliters of water to dissolve the sodium acetate. The oil layer was separated and distilled rapidly under reduced pressure. There was obtained 400 grams of ethyl 4-(2-cyclopentenyl)-3-ketobutyrate having a boiling range of 100° C. to 155° C. at an absolute pressure of 5 millimeters of mercury. By titration with sodium methylate in pyridine the purity was found to be 94.6 percent. Analysis of the midfraction (183 grams) showed that it contained 82.4 grams of product. The yield based on the 2-cyclopentenyl acetone was 85 percent.

*Part (d).*—Eight hundred nineteen grams of ethyl 4-(2-cyclopentenyl)-3-ketobutyrate, having a purity of 93.1 percent (3.89 mols) were added dropwise over a period of one hour to 2180 grams of a well-stirred aqueous solution of sodium hydroxide (9.5 percent; 5.18 mols) maintained at a temperature of 20° C. to 25° C. At the end of 16 hours, the solution was neutralized to a pH of 7.5 with carbon dioxide.

Fifteen hundred grams of an aqueous solution of pyruvic aldehyde (22.4 percent; 4.67 mols) which had been neutralized to a pH of 7 with 26 grams of sodium bicarbonate was fed to the neutralized solution of the beta-keto acid over a period of 1.25 hours while the reaction mixture was maintained at a temperature of 25° C. To complete the reaction, the mixture was allowed to stand 21 hours and then extracted four times with successive 1-liter portions of diisopropyl ether. The four extracts were combined and stripped of volatile material to a kettle temperature of 100° C. under a reduced pressure of 4 millimeters of mercury, absolute. There was obtained as a residue product 742 grams of 6-(2-cyclopentenyl)-3-hydroxyhexane-2,5-dione which was found by analysis to have a purity of 75.8 percent. The yield was 74 percent based on the ethyl-4-(2-cyclopentenyl)-3-ketobutyrate.

*Part (e).*—Three hundred sixty-eight grams of 6-(2-cyclopentenyl)-3-hydroxyhexane-2,5-dione having a purity of 75.8 percent (1.42 mols) was fed dropwise over a period of 30 minutes to 3312 grams of a 2 percent aqueous sodium hydroxide, vigorously stirred and maintained at a temperature of 20° C. to 25° C. After a period of 4 hours allowed for completion of the reaction, the mixture was saturated with sodium chloride and four successive extractions were made, each with one-liter portions of diisopropyl ether. The four extracts were combined, neutralized with 2 grams of acetic acid and distilled under reduced pressure. There was obtained 139 grames of a product fraction which distilled from a temperature of 120° C. at an absolute pressure of 2.5 millimeters of mercury to a temperature of 170° C. at an absolute pressure of 5 millimeters of mercury. This product was found by analysis to contain 72.8 percent of 2-(2-cyclopentenyl)-3-methyl-2-cyclopenten-4-ol-1-one. The yield was 40 percent.

*Part (f).*—A mixture was formed of 275 grams of 2-(2-cyclopenten)-4-ol-1-one (purity 70.8 percent; 1.094 mols), 156 grams of pyridine and 0.905 liter of ethanol. To this mixture was added a solution of 183 grams of semicarbazide hydrochloride (1.64 mols) in 220 milliliters of water. The mixture was allowed to stand 16 hours and at the end of that time the crystals of the semicarbazone which had formed were filtered and washed with 4 liters of water to remove chloride. Upon crystallizing the semicarbazone from ethanol, 181 grams of colorless crystals having a melting point of 208° C. to 210° C. were obtained. The yield of the pure semicarbazone of 2-(2-cyclopentenyl)-3-methyl-2-cyclopenten-4-ol-1-one was 71 percent.

A mixture of 181 grams of the pure semicarbazone (0.77 mol), 1.6 liters of water, 1.6 liters of diisopropyl ether and 1047 grams of potassium acid sulfate (7.7 mols) was stirred at 60° C. to 65° C. for a period of 2.5 hours. By that time all of the semicarbazone had dissolved which indicated that hydrolysis had taken place and was complete. The aqueous layer was separated and extracted three times with 200 milliliter portions of diisopropyl ether. The three extracts were combined with the oil layer from the hydrolysis and the whole washed with 200 milliliters of saturated sodium chloride solution. Upon distillation of the ether solution there was obtained 101 grams of 2-(2-cyclopentenyl)-3-methyl-2-cyclopenten-4-ol-1-one characterized by the following properties: boiling point at an absolute pressure of 1 millimeter of mercury, 131° C.; refractive index ($n_D^{30}$), 1.5350; purity (by analyses for hydroxyl content), 96.7 percent. The yield based on the semicarbazone was 84 percent, with credit being taken for 17 grams of product contained in the mid-fraction and column holdup.

*Part (g).*—A mixture of 92 grams of 2-(2-cyclopentenyl)-3-methyl-2-cyclopenten-4-ol-1-one having a purity of 96.7 percent (0.5 mols), 168 grams of chrysanthemummonocarboxylic anhydride having a purity of 94.8 percent (0.5 mol) and 119 grams of dry butyl ether was refluxed at a temperature of 165° C. for a period of 4 hours. The solution was diluted with 42 grams of butyl ether and washed successively with 263 grams of 7.6 percent aqueous sodium hydroxide (0.5 mol), 0.25 liter of 2 percent aqueous sodium hydroxide (0.125 mol) and 0.25 liter of water. The washes were each extracted in sequence with a single 0.1 liter portion of dibutyl ether to minimize loss of product. The washed oil and extract were combined, stripped of volatile material at a kettle end temperature of 80° C. at a reduced pressure of 5 millimeters of mercury, absolute, and thereafter stripped with steam. There was obtained 162 grams of residue product characterized by the following properties: refractive index, ($n_D^{30}$) 1.5120; specific gravity (20/20° C.), 1.033; purity by the ethylene diamine method, 87.1 percent; acid content, as chrysanthemummonocarboxylic acid, 0.1 percent; and chrysanthemummonocarboxylic anhydride content, 0.2 percent. The yield based on the reactants was 88 percent, with credit being taken for 4.3 grams of product consumed in analysis of the reaction mixture for anhydride content.

A number of formulations were prepared in which cyclethrin prepared according to a procedure the same as or similar to those described in Example 1 was tested for efficiency in admixture with a variety of compounds having a synergistic effect. These formulations were tested by the Peet-Grady Method (Official Method of the Chemical Specialties Manufacturers Association). The results of these tests together with the comparison test results obtained with the Official Test Insecticide (herein referred to as OTI) and with allethrin formulations similarly synergized are given in the following examples:

EXAMPLE 2

| Formulation | A | B | OTI |
|---|---|---|---|
| cyclethrin, milligrams | 25 | | |
| allethrin, milligrams | | 25 | |
| pyrethrins, milligrams | | | 100 |
| piperonyl butoxide, milligrams | 200 | 200 | |
| deodorized kerosene fraction, milliliters | 100 | 100 | 100 |

*Large group Peet-Grady results*

| Formulation | No. of Tests | Percent Kill, 24 Hrs. | Percent Knockdown, 10 min. | OTI Difference | |
|---|---|---|---|---|---|
| | | | | Kill | Knockdown |
| A. cyclethrin | 5 | 61.3 | 91.2 | +25 | −2.8 |
| B. allethrin | 5 | 40.0 | 90.0 | +4 | −4.0 |
| OTI | 8 | 35.5 | 94.0 | | |

These test results show that the plus value for kill and the minus value for knockdown of the synergized cyclethrin compared with OTI are better by 21 and 1.2 percentage points, respectively, than a similar comparison of synergized allethrin with OTI.

EXAMPLE 3

| Formulation | A | B | OTI |
|---|---|---|---|
| cyclethrin, milligrams | 50 | | |
| allethrin, milligrams | | 50 | |
| pyrethrins, milligrams | | | 100 |
| n-octyl sulfoxide of isosafrole, milligrams | 250 | 250 | |
| deodorized kerosene fraction, milliliters | 100 | 100 | 100 |

*Large group Peet-Grady results*

| Formulation | No. of Tests | Percent Kill, 24 Hrs. | Percent Knockdown, 10 min. | OTI Difference | |
|---|---|---|---|---|---|
| | | | | Kill | Knockdown |
| A. cyclethrin | 6 | 74.9 | 96.5 | +38 | +1.4 |
| B. allethrin | 6 | 37.2 | 90.6 | 0 | −4.5 |
| OTI | 8 | 37.0 | 95.1 | | |

These test results show that the plus values for kill and knockdown of the synergized cyclethrin compared with OTI are better by 38 and 5.9 percentage points, respectively, than a similar comparison of synergized allethrin with OTI.

EXAMPLE 4

| Formulation | A | B | OTI |
|---|---|---|---|
| cyclethrin, milligrams | 42 | | |
| allethrin, milligrams | | 42 | |
| pyrethrins, milligrams | | | 100 |
| n-propyl isome,[1] milligrams | 600 | 600 | |
| deodorized kerosene fraction, milliliters | 100 | 100 | 100 |

[1] By n-propyl isome is meant (di-n-propyl-2-methyl-6,7-methylene dioxy-1,2,3,4-hexahydronaphthalene-3,4-dicarboxylate.)

*Large group Peet-Grady results*

| Formulation | No. of Tests | Percent Kill, 24 Hrs. | Percent Knockdown, 10 min. | OTI Difference | |
|---|---|---|---|---|---|
| | | | | Kill | Knockdown |
| A. cyclethrin | 4 | 65.1 | 92.1 | +33 | −3.9 |
| B. allethrin | 4 | 47.2 | 94.0 | +15 | −2.0 |
| OTI | 4 | 32.6 | 96.0 | | |

The results of this test show that the plus value for kill for synergized cyclethrin compared with OTI is better by 18 percentage points than a similar comparison of synergized allethrin with OTI; while the knockdown is only slightly less favorable by −1.9 percentage point.

EXAMPLE 5

| Formulation | A | B | OTI |
|---|---|---|---|
| cyclethrin, milligrams | 40 | | |
| allethrin, milligrams | | 40 | |
| pyrethrins, milligrams | | | 100 |
| sesame oil, milligrams | 150 | 150 | |
| deodorized kerosene fraction, milliliters | 100 | 100 | 100 |

*Large group Peet-Grady results*

| Formulation | No. of Tests | Percent Kill, 24 Hrs. | Percent Knockdown, 10 min. | OTI Difference Kill | OTI Difference Knockdown |
|---|---|---|---|---|---|
| A. cyclethrin | 3 | 26.1 | 89.8 | −11 | −6.4 |
| B. Allethrin | 3 | 18.8 | 90.8 | −18 | −5.4 |
| OTI | 5 | 37.4 | 96.2 | | |

The results of this test show that the value for kill of the sesame oil-synergized cyclethrin, even though minus compared with OTI, is better by +7 percentage points than a similar comparison of synergized allethrin with OTI; while the knockdown is only slightly less favorable by −1 percentage point.

EXAMPLE 6

| Formulation | A | B | OTI |
|---|---|---|---|
| cyclethrin, milligrams | 30 | | |
| allethrin, milligrams | | 30 | |
| pyrethrins, milligrams | | | 100 |
| synergist 6266,[1] milligrams | 1,000 | 1,000 | |
| deodorized kerosene fraction, milliliters | 100 | 100 | 100 |

[1] Chemical identification: N-(hexoxyethoxypropyl)-bicyclo-[2.2.1]-5-heptene-2,3-dicarboximide.

*Large group Peet-Grady results*

| Formulation | No. of Tests | Percent Kill, 24 Hrs. | Percent Knockdown, 10 min. | OTI Difference Kill | OTI Difference Knockdown |
|---|---|---|---|---|---|
| A. cyclethrin | 5 | 46.6 | 94.2 | +13 | +0.2 |
| B. allethrin | 5 | 31.4 | 92.1 | −3 | −1.9 |
| OTI | 8 | 34.3 | 94.0 | | |

The results of this test show that the plus values for kill and knockdown of the synergized cyclethrin, compared with OTI, are better by 16 and 2.1 percentage points, respectively, than a similar comparison of synergized allethrin with OTI.

EXAMPLE 7

| Formulation | A | B | OTI |
|---|---|---|---|
| cyclethrin, milligrams | 51 | | |
| allethrin, milligrams | | 51 | |
| pyrethrins, milligrams | | | 100 |
| synergist 264,[1] milligrams | 1,000 | 1,000 | |
| deodorized kerosene fraction, milliliters | 100 | 100 | 100 |

[1] Chemical identification: N-(2-ethylhexyl)-bicyclo-[2.2.1]-5-heptene-2,3-dicarboximide.

*Large group Peet-Grady results*

| Formulation | No. of Tests | Percent Kill, 24 Hrs. | Percent Knockdown, 10 min. | OTI Difference Kill | OTI Difference Knockdown |
|---|---|---|---|---|---|
| A. cyclethrin | 5 | 31.8 | 93.0 | +7 | −1.5 |
| B. allethrin | 5 | 29.0 | 90.7 | +4 | −3.8 |
| OTI | 8 | 24.9 | 94.5 | | |

According to these tests, the Official Test Insecticide (OTI) is only 1.5 percentage points better than synergized cyclethrin for knockdown, as compared with 3.8 percentage points better than synergized allethrin, a superiority of 2.3 percentage points in favor of cyclethrin over allethrin for knockdown.

EXAMPLE 8

Tests were carried out on a formulation containing cyclethrin as an oil-base livestock spray in comparison with a commercial oil-base livestock spray containing pyrethrins. The proportion of ingredients present in the formulation was as follows:

| Formulation | A | B | C |
|---|---|---|---|
| cyclethrin, milligrams | | | 15 |
| pyrethrins, milligrams | 25 | 15 | |
| piperonyl butoxide, milligrams | 200 | 120 | 120 |
| polyoxypropylene glycol monobutyl ether | | 5 | 5 |
| Spray oil added to make up solutions to a volume of 100 milliliters. | | | |

The tests were carried out on dairy cattle in a South Atlantic State and ten cows were used for treatment by each formulation. The cows were sprayed twelve times and the sprays were applied at intervals of three to four days at a rate of two ounces per animal. The sprays were applied in mid-afternoon and counts were taken at noon on the following day, of horn flies (=h); stable flies (=S; and house flies (=H). The ratio of the fly species in total population was 50, 20 and 30 percent, respectively, for horn flies, stable flies and house flies.

The results of these tests in terms of repellency are given in the following table:

| | Fly Species | Percent Repellency at— | | | Repellency for Period, Average |
|---|---|---|---|---|---|
| | | 24 hr | 48 hr. | 72 hr. | |
| Spray A (pyrethrins) | h, S, H | 65.7 | 55.4 | 31.8 | 50.9 |
| | S, H | 44.4 | 41.7 | 3.0 | 29.7 |
| | S | 50.9 | 41.2 | 21.5 | 37.9 |
| | H | 40.0 | 35.3 | 43.1 | 39.5 |
| | h | 90.0 | 76.8 | 47.8 | 71.5 |
| Spray B (pyrethrins) | h, S, H | 71.5 | 63.8 | 50.2 | 61.8 |
| | S, H | 49.7 | 50.0 | 27.7 | 42.5 |
| | S | 71.1 | 35.8 | 40.5 | 49.1 |
| | H | 57.3 | 44.5 | 48.8 | 50.2 |
| | h | 88.0 | 88.1 | 74.6 | 81.6 |
| Spray C (cyclethrin) | h, S, H | 74.2 | 63.0 | 52.0 | 63.1 |
| | S, H | 60.0 | 43.0 | 0 | 34.7 |
| | S | 74.9 | 47.1 | 52.3 | 58.1 |
| | H | 65.2 | 41.4 | 55.5 | 54.0 |
| | h | 84.7 | 88.6 | 93.7 | 89.0 |

The above values for percentage repellency is based on the number of counts taken, as follows:

| Fly Species | 24 Hrs. | 48 Hrs. | 72 Hrs. |
|---|---|---|---|
| h, S, H; no. of counts | 120 | 110 | 100 |
| S, H; no. of counts | 30 | 30 | 20 |
| S; no. of counts | 90 | 80 | 80 |
| H; no. of counts | 90 | 80 | 80 |
| h; no. of counts | 120 | 110 | 100 |

According to these tests, the synergized cyclethrin formulation as an oil-base live stock spray is shown to be more effective in repellency against horn, stable and house flies than commercial formulations of synergized pyrethrins. It is to be noted that Spray C is superior to Spray B, and at the same time cheaper than Spray B and, accordingly, Spray A. Thus, at current prices for the ingredients of the respective formulations, this increased effectiveness with synergized cyclethrin is obtainable without increase in cost.

EXAMPLE 9

Formulations employing the same proportions of ingredients as those of Example 8, except that deodorized kerosene was substituted for the spray oil of Example 8, were made as follows:

| Formulation | OTI | A | B | C |
|---|---|---|---|---|
| piperonyl butoxide, milligrams | | 200 | 120 | 120 |
| pyrethrins, milligrams | 100 | 25 | 15 | |
| Crag Fly Repellent,[1] milliliters | | | 5 | 5 |
| cyclethrin, milligrams | | | | 15 |
| Deodorized kerosene to make 100 milliliters of solution. | | | | |

[1] Polyoxypropylene glycol monobutyl ether.

*Large group Peet-Grady test results for control of flies*

| Formulation | No. of Tests | Percent Knockdown | | | Percent Kill, 24 Hours | OTI difference and rating |
|---|---|---|---|---|---|---|
| | | 3 min. | 5 min. | 10 min. | | |
| A | 6 | 86.1 | 90.2 | 95.2 | 67.9 | +31 AA |
| B | 6 | 87.0 | 92.6 | 96.0 | 72.3 | +36 AA |
| C | 6 | 80.8 | 85.4 | 93.6 | 70.3 | +34 AA |
| OTI | 10 | 91.5 | 93.9 | 94.9 | 36.7 | −B |

According to these tests, Spray C is as effective in knockdown and kill as Spray B, while at the same time it is less expensive.

EXAMPLE 10

The efficacy against the German roach was determined for cyclethrin alone, and for cyclethrin in combination with sulfoxide (n-octyl sulfoxide of isosafrole) as synergist.

*Formulation, Series 1*

| Formulation[1] | Cyclethrin, milligrams | Allethrin, milligrams | Sulfoxide, milligrams |
|---|---|---|---|
| A | 80 | | |
| B | 40 | | |
| C | 20 | | |
| D | 10 | | |
| E | 10 | | 50 |
| F | 5 | | 25 |
| G | 2.5 | | 12.5 |
| H | | 40 | |
| I | | 20 | |
| J | | 10 | |
| K | | 5 | |
| L | | 5 | 25 |
| M | | 2.5 | 12.5 |
| N | | 1.25 | 6.25 |

[1] In addition, each of the solutions contained 0.02 milliliter of "Triton"; 5 milliliters of acetone, and the whole made up with water to a total volume of 0.1 liter.

A second series of tests were run employing the following formulations.

*Formulation, Series 2*

| Formulation | Cyclethrin, milligrams | Allethrin, milligrams | Sulfoxide, milligrams |
|---|---|---|---|
| A | 80 | | |
| B | 40 | | |
| C | 20 | | |
| D | 10 | | |
| E | 5 | | |
| F | 10 | | 50 |
| G | 5 | | 25 |
| H | 2.5 | | 12.5 |
| I | | 20 | |
| J | | 10 | |
| K | | 5 | |
| L | | 2.5 | |
| M | | 1.25 | |
| N | | 5 | 25 |
| O | | 2.5 | 12.5 |
| P | | 1.25 | 6.25 |

The results in terms of the dosage required to kill 50 percent of the roaches in 24 hours are given in the following table.

*Results, Series 2*

| Formulation | Milligrams for kill LD-50, 24 hours |
|---|---|
| A through E (cyclethrin) | 15 |
| F through H (cyclethrin) | 4.5 |
| I through M (allethrin) | 3 |
| N through P (allethrin) | 2.7 |

In both series, cyclethrin was synergized more effectively than allethrin. In the case of allethrin, only one-half or less of the amount required unsynergized was saved by synergizing it, whereas in the case of cyclethrin it was possible to save from two-thirds to four-fifths of the amount required unsynergized.

EXAMPLE 11

The efficacy against the bean aphid on nasturtium plants was determined for cyclethrin, alone, and cyclethrin synergized with sulfoxide (n-octyl sulfoxide of isosafrole), and synergist 6266 (N-(hexoxyethoxypropyl)-bicyclo-[2.2.1]-5-heptene-2,3-dicarboximide). Similar tests were also made with allethrin.

| Formulation[1] | Allethrin, Milligrams | Cyclethrin, Milligrams | Sulfoxide, Milligrams | Synergist 6266, Milligrams |
|---|---|---|---|---|
| A | 100 | | | |
| B | 50 | | | |
| C | 25 | | | |
| D | 12.5 | | | |
| E | 6.25 | | | |
| F | 12 | | 60 | |
| G | 6 | | 30 | |
| H | 3 | | 15 | |
| I | | 100 | | |
| J | | 50 | | |
| K | | 25 | | |
| L | | 12.5 | | |
| M | | 6.25 | | |
| N | | 12 | 60 | |
| O | | 6 | 30 | |
| P | | 3 | 15 | |
| Q | 12 | | | 60 |
| R | 6 | | | 30 |
| S | 3 | | | 15 |
| T | | 12 | | 60 |
| U | | 6 | | 30 |
| V | | 3 | | 15 |
| W | 12 | | | 60 |
| X | 6 | | | 30 |
| Y | 3 | | | 15 |
| Z | | 12 | | 60 |
| AA | | 6 | | 30 |
| BB | | 3 | | 15 |

[1] In addition, each of the formulations contained 10 milliliters of acetone, an amount of emulsifier which was 10 percent of the total weight of toxicant (allethrin or cyclethrin, plus synergist when used), and water in an amount such as to make a total volume of 0.1 liter.

The resulting mixture was agitated and sprayed on potted nasturtium plants, each pot of plants being infected with approximately 250 nymph and adult bean aphids. Potted plants were set on a revolving turn-table and 80 milliliters of the 100 milliliters of the formulation were applied from a De Vilbiss sprayer, model CH 62041, under a pressure of 40 pounds per square inch. Counts of dead aphids were taken twenty-four hours after treatment was applied. Dosage series tests were conducted and the results plotted on a log probability scale.

The results in terms of the LD-50 and the LD-95 for a 24-hour kill were as follows:

| Formulation | Milligrams for kill within 24 hours | |
|---|---|---|
| | LD-50 | LD-95 |
| A through E (allethrin) | 10 | 70 |
| F through H (allethrin) | 2 | 20 |
| I through M (cyclethrin) | 10 | 80 |
| N through P (cyclethrin) | 1 | 11 |
| Q through S (allethrin) | 6 | 14 |
| T through V (cyclethrin) | 2 | 12 |
| W through Y (allethrin) | 5 | 13 |
| Z through BB (cyclethrin) | 3 | 9.5 |

According to the results of these tests, cyclethrin is rendered more effective by the synergists than is allethrin, by a considerable factor.

EXAMPLE 12

A comparison was made of cyclethin and allethrin against houseflies in large group Peet-Grady tests. The results, which are the average of five tests are given in the following table:

| Material | Concentration [1] | Percent kill, 24 Hours | Percent knockdown, 10 minutes |
|---|---|---|---|
| Allethrin | 200 | 48.6 | 97.5 |
| Cyclethrin | 200 | 44.1 | 96.5 |
| Allethrin | 100 | 25.8 | 91.4 |
| Cyclethrin | 100 | 26.6 | 89.6 |
| Allethrin | 50 | 14.7 | 83.1 |
| Cyclethrin | 50 | 16.4 | 78.8 |

[1] In milligrams per 100 milliliters of solution in deodorized kerosene fraction.

An analysis of the variance of the above results shows no significant difference in the performance of allethrin and cyclethrin when used unsynergized against house flies.

EXAMPLE 13

Synergized cyclethrin was compared with synergized allethrin against houseflies in large-group Peet-Grady tests. The synergists were piperonyl butoxide (3,4-methylenedioxy-6-propyl) benzyl butyl diethylene glycol ether), synergist 6266 (N-(hexoxyethoxypropyl)-bicyclo-[2.2.1]-5-heptene-2,3-dicarboximide) sulfoxide (n-octyl sulfoxide of isosafrole) and n-propyl isome (di-n-propyl-2-methyl-6,7-methylene dioxy-1,2,3,4-hexahydronauhthalene-3,4-dicarboxylate).

| Formulation | A1 | A2 | B1 | B2 | C1 | C2 | D1 | D2 |
|---|---|---|---|---|---|---|---|---|
| allethrin, milligrams | 25 | | 30 | | 50 | | 50 | |
| cyclethrin, milligrams | | 25 | | 30 | | 50 | | 50 |
| piperonyl butoxide, milligrams | 200 | 200 | | | | | | |
| synergist 6266, milligrams | | | 1,000 | 1,000 | | | | |
| sulfoxide, milligrams | | | | | 250 | 250 | | |
| n-propyl isome, milligrams | | | | | | | 250 | 250 |
| deodorized kerosene fraction, milliliters | 100 | 100 | 100 | 100 | 100 | 100 | 100 | 100 |

The results which are the average of four tests are given in the following table:

| Formulation | Percent kill, 24 Hours | Percent knockdown, 10 Minutes |
|---|---|---|
| A1 (allethrin plus piperonyl butoxide) | 40.0 | 90.0 |
| A2 (cyclethrin plus piperonyl butoxide) | 61.3 | 91.2 |
| B1 (allethrin plus synergist 6266) | 31.4 | 92.1 |
| B2 (cyclethrin plus synergist 6266) | 46.6 | 94.2 |
| C1 (allethrin plus sulfoxide) | 37.2 | 90.6 |
| C2 (cyclethrin plus sulfoxide) | 74.9 | 96.5 |
| D1 (allethrin plus n-propyl isome) | 42.3 | 92.0 |
| D2 (cyclethrin plus n-propyl isome) | 63.4 | 92.8 |

The amount of unsynergized cyclethrin and unsynergized allethrin that would be required to give the same percent kill and knockdown as was obtained above with the synergized material can be estimated by plotting graphically the results of Example 12 and taking off from the curves thus obtained the amounts corresponding to the kills and knockdowns for the synergized material above. The amounts thus estimated are given in the following table:

| Formulation [1] | Equivalent amount (milligrams) of toxicant for the same effect. | | | |
|---|---|---|---|---|
| | 24 hour kill | | 10 minute knockdown | |
| | allethrin | cyclethrin | allethrin | cyclethrin |
| A1 (allethrin, 25; piperonyl butoxide 200) | 160 | | 78 | |
| A2 (cyclethrin, 25; piperonyl butoxide 200) | | 350 | | 98 |
| B1 (allethrin, 30; synergist 6266, 1,000) | 112 | | 107 | |
| B2 (cyclethrin, 30; synergist 6266, 1,000) | | 205 | | 140 |
| C1 (allethrin, 50; sulfoxide, 250) | 143 | | 94 | |
| C2 (cyclethrin, 50; sulfoxide, 250) | | 620 | | 180 |
| D1 (allethrin, 50; n-propyl isome, 250) | 175 | | 106 | |
| D2 (cyclethrin, 50; n-propyl isome, 250) | | 380 | | 112 |

[1] Values in milligrams are given per 100 milliliters of deodorized kerosene fraction.

The ratio of effectiveness of the synergized to unsynergized toxicant (allethrin, synergized v. unsynergized; cyclethrin, synergized v. unsynergized) based on the foregoing values, are as follows:

| Synergist | Kill | | Knockdown | |
|---|---|---|---|---|
| | allethrin | cyclethrin | allethrin | cyclethrin |
| Piperonyl butoxide | 6.4 | 14.0 | 3.1 | 3.9 |
| Synergist 6266 | 3.7 | 6.8 | 3.6 | 4.7 |
| Sulfoxide | 2.9 | 12.4 | 1.9 | 3.6 |
| n-Propylisome | 3.5 | 7.6 | 2.1 | 2.2 |
| Average | 4.1 | 10.2 | 2.7 | 3.6 |

According to the above results, cyclethrin in overall performance is ten times more effective synergized than unsynergized, as compared with allethrin in overall performance which is only four times more effective synergized than unsynergized. For knockdown alone, cyclethrin is four times more effective synergized than unsynergized, whereas allethrin, for knockdown alone, is only three times more effective synergized than unsynergized.

EXAMPLE 14

Tests were conducted on the common housefly using cyclethrin in aerosol formulations according to the official specifications of the Standard Aerosol Test Method for Flying Insects. Comparison tests were also carried out using allethrin. Equal parts of dichlorodifluoromethane (Freon 11) and trichlorofluoromethane (Freon 12) made up 85 parts by weight of each of the formulations. The remaining 15 parts by weight of ingredients making up the formulations were as follows:

| Formulation | Cyclethrin | Allethrin | DDT | Strobane | Piperonyl Butoxide | Sulfoxide | Bayol D | Sovacide 544-C |
|---|---|---|---|---|---|---|---|---|
| A | 0.4 | | 2.0 | | | | 7.6 | 5.0 |
| B | | 0.4 | 2.0 | | | | 7.6 | 5.0 |
| C | 0.34 | | 2.0 | | 1.6 | | 4.56 | 6.5 |
| D | | 0.4 | 2.0 | | 1.6 | | 4.56 | 6.5 |
| E | 0.34 | | 2.0 | | | 1.6 | 4.56 | 6.5 |
| F | | 0.4 | 2.0 | | | 1.6 | 4.56 | 6.5 |
| G | 0.34 | | | | 1.6 | | 6.56 | 6.5 |
| H | | 0.4 | | | 1.6 | | 6.56 | 6.5 |
| I | 0.34 | | | | | 1.6 | 6.56 | 6.5 |
| J | | 0.4 | | | | 1.6 | 6.56 | 6.5 |
| K | 0.34 | | | 2.0 | | | 4.56 | 6.5 |
| L | | 0.4 | | 2.0 | | | 4.56 | 6.5 |

NOTE.—DDT is dichlorodiphenyltrichloroethane; Bayol D is kerosene, highly refined; Strobane is chlorinated hydrocarbon containing 65 per cent chlorine, by weight; Sovacide 544-C is aromatic petroleum solvent.

*Large group Peet-Grady results*

| Formulation [1] | Percent kill, 24 hrs. | Percent Knockdown, 15 min. | Referred to TOTA number | Difference from TOTA Test | |
|---|---|---|---|---|---|
| | | | | Kill | Knockdown |
| A | 91.8 | 80.3 | 1 | +2 | +7 |
| B | 93.2 | 83.0 | 1 | +4 | +10 |
| C | 96.9 | 94.2 | 2 | +6 | +19 |
| D | 91.0 | 85.5 | 3 | +1 | +8 |
| E | 94.0 | 89.9 | 2 | +3 | +14 |
| F | 93.5 | 87.6 | 3 | +4 | +10 |
| G | 85.8 | 91.9 | 4 | −5 | +12 |
| H | 77.1 | 83.3 | 4 | −13 | +4 |
| I | 85.9 | 90.6 | 4 | −5 | +11 |
| J | 78.7 | 84.9 | 4 | −12 | +5 |
| K | 89.2 | 87.3 | 3 | −1 | +10 |
| L | 86.9 | 81.9 | 3 | −3 | +5 |
| TOTA-1 | 89.6 | 73.5 | | | |
| TOTA-2 | 90.9 | 75.5 | | | |
| TOTA-3 | 90.0 | 77.3 | | | |
| TOTA-4 | 90.5 | 79.5 | | | |

[1] The number of tests carried out on each formulation was five, except in TOTA-3 and TOTA-4 where ten tests were run. The dosage was the same for each test, 3.0 grams per 1000 cubic feet.

Acording to the foregoing data obtained with typical aerosol-type formulations, synergized cyclethrin formulations are in every instance superior to similar synergized allethrin formulations.

EXAMPLE 15

The efficacy against Mexican bean beetle larvae on tendergreen bean was determined for cyclethrin alone and cyclethrin synergized with synergist MGK 264, (N-2-(ethylhexy) - bicyclo - [2,2,1]-5-heptene-2,3-dicarboximide) and synergist 6266 (N-(hexoxyethoxypropyl)-bicyclo-[2,2,1]-5-heptene-2,3-dicarboximide). Similar tests were also run with allethrin and pyrethrins.

Preparation of formulations and spraying of plants was done by the method employed in evaluating cyclethrin on bean aphid (Example 11). Two bean plants were used per concentration. After plants had been sprayed and were thoroughly dry, each plant was enclosed in a spherical screened cage in which four third instar larvae had been previously placed. Test plants and insects were kept under fluorescent light at room temperature. Counts of dead larvae were taken after a 72-hour exposure period. Dosage series tests were conducted and results plotted on log probability paper. Results in terms of 50 percent lethal dose (LD-50) were as follows:

| Formulation [1] | Cyclethrin, milligrams | Allethrin, milligrams | Triton | Synergist 264 | Synergist 6266 |
|---|---|---|---|---|---|
| A | 25 | | 2.5 | | |
| B | 12.5 | | 1.25 | | |
| C | 6.25 | | 0.625 | | |
| D | 3.125 | | 0.3125 | | |
| E | | 25 | 2.5 | | |
| F | | 12.5 | 1.25 | | |
| G | | 6.25 | 0.625 | | |
| H | | 3.125 | 0.3125 | | |
| I | 12 | | 7.2 | | 60 |
| J | 6 | | 3.6 | | 30 |
| K | 3 | | 1.8 | | 15 |
| L | | 12 | 7.2 | | 60 |
| M | | 6 | 3.6 | | 30 |
| N | | 3 | 1.8 | | 15 |
| O | | 3 | 1.8 | | 15 |
| P | 12 | | 7.2 | 60 | |
| Q | 6 | | 3.6 | 30 | |
| R | 3 | | 1.8 | 15 | |
| S | | 12 | 7.2 | 60 | |
| T | | 6 | 3.6 | 30 | |
| U | | 3 | 1.8 | 15 | |

[1] In addition each formulation contained 10 milliliters of acetone and sufficient water to make a total volume of 0.1 liter.

The results are set forth in the following table:

| Formulation | Dosage for kill of Mexican Bean Beetle Larvae, milligrams |
|---|---|
| A through D (cyclethrin) | 10 |
| E through H (allethrin) | 6 |
| I through K (cyclethrin) | 6 |
| L through O (allethrin) | 5 |
| P through R (cyclethrin) | 8 |
| S through U (allethrin) | 12 |

According to the foregoing results, cyclethrin is activated by synergists 264 and 6266 to a greater extent than is allethrin.

EXAMPLE 16

The toxicity to rice weevil was determined for cyclethrin alone, and cyclethrin synergized with sulfoxide, piperonyl butoxide and sulfone. For purposes of comparison similar tests were made with allethrin, unsynergized and synergized. In preparing the formulations, the active ingredient or active ingredient plus synergist was dissolved in acetone. An inert dust, in this case wheat dust, was then added to bring the total weight to 100 grams. The materials were then thoroughly mixed to insure uniformity and the acetone allowed to evaporate completely from the mixture. The formulation was again thoroughly mixed on a ball mill for one-half hour. The formulations are given in the following table:

| Material | A | B | C | D | E | F | G | H |
|---|---|---|---|---|---|---|---|---|
| Cyclethrin, milligrams | 500 | | 100 | 100 | 100 | | | |
| Allethrin, milligrams | | 500 | | | | 100 | 100 | 100 |
| Piperonyl butoxide, milligrams | | | 1,600 | | | 1,600 | | |
| Sulfoxide, milligrams | | | | 1,600 | | | 1,600 | |
| Sulfone, milligrams | | | | | 1,600 | | | 1,600 |
| Inert diluent (wheat dust) grams | 99.5 | 99.5 | 98.3 | 98.3 | 98.3 | 98.3 | 98.3 | 98.3 |

The above formulations were placed in four ounce bottles containing two ounces of wheat and the contents mixed by shaking for one-half hour. One hundred adult rice weevils were then introduced into each bottle and allowed to feed for a period of one week. Mortality counts were taken at the end of this exposure. Dosage series tests were run and the results plotted on log probability paper. The results for seven day mortality in terms of lethal dose for 50 percent kill were as follows:

| Formulation | Dosage required for 50 percent kill within seven days, milligrams |
|---|---|
| A (cyclethrin) | 500 |
| B (allethrin) | 260 |
| C (cyclethrin) | 70 |
| D (cyclethrin) | 50 |
| E (cyclethrin) | 52 |
| F (allethrin) | 62 |
| G (allethrin) | 58 |
| H (allethrin) | 51 |

According to the foregoing results, cyclethrin, although only one-third as effective as allethrin when used alone, is activated or synergized to a greater degree than is allethrin by the synergists employed. Under actual use conditions, both allethrin and cyclethrin would be used with synergists because of the prohibitive cost of these compounds if used unsynergized. Cyclethrin, because of its freedom from mammalian toxicity, has the advantage that it can be used to protect grain products.

EXAMPLE 17

Another use for cyclethrin indicating its wide range of usefulness is as a larvicide for the control of mosquito larvae. In laboratory tests allethrin and cyclethrin alone, or each with synergist sulfoxide were stirred into 100 milliliters of water containing 20 third instar larvae of the yellow fever mosquito, Aëdes aegypti L. Results for the number of dead larvae were taken 48 hours after the larvae were in the water medium. Data shown below indicate the effectiveness of cyclethrin compared with allethrin.

| Formulation | Dosage Required for 50 percent Kill (LD-50) in 48 hrs., parts per million |
|---|---|
| Allethrin | 0.08 |
| Cyclethrin | 0.07 |
| Allethrin+sulfoxide [1] | 0.046 |
| Cyclethrin+sulfoxide [2] | 0.043 |
| Untreated checks | 0 |

[1] 1 part allethrin+5 parts sulfoxide.
[2] 1 part cyclethrin+5 parts sulfoxide.

EXAMPLE 18

The synergistic effect of polyoxypropylene glycol mono-butyl ether (viscosity at 100° F.; 100 S.U.S.; average molecular weight about 850) known commercially as Crag Fly Repellant was tested. The following formulations were preferred:

| Formulation | A | B | OTI |
|---|---|---|---|
| cyclethrin, milligrams | 84 | 84 | |
| allethrin, milligrams | | | |
| pyrethrins, milligrams | | | 100 |
| Fly repellant, milliliters | 10 | 10 | |
| deodorized kerosene, milliliters | 90 | 90 | 90 |

*Large group Peet-Grady test results*

| Formulation | No. of Tests | Percent Kill, 24 Hrs. | Percent Knockdown, 10 min. | OTI Difference | |
|---|---|---|---|---|---|
| | | | | Kill | Knockdown |
| A. cyclethrin | 3 | 84 | 96.8 | +40 | +0.3 |
| B. allethrin | 3 | 73.2 | 98.1 | +29 | +1.6 |
| OTI | 6 | 44.0 | 96.5 | | |

The results of this test show that the plus value for kill of synergized cyclethrin compared with OTI is better by +11 percentage points than a similar comparison of synergized allethrin; while the knockdown is only slightly less favorable by −1.3 percentage point.

What is claimed is:
1. As a new composition of matter, 3-(2-cyclopentenyl)-2-methyl-4-oxo-2-cyclopentenyl chrysanthemum-monocarboxylate, represented by the graphic formula,

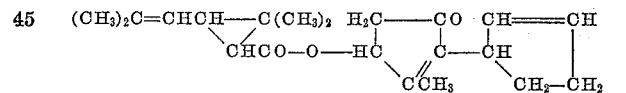

2. As a new composition of matter, a lower alkyl 4-(2-cyclopentenyl)-3-ketobutyrate, represented by the graphic formula,

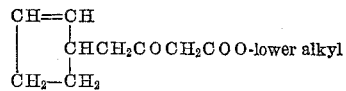

3. As a new composition of matter, 4-(2-cyclopentenyl)-3-ketobutyric acid and its alkali metal salt, represented by the graphic formula,

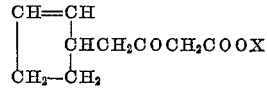

where X is of the group consisting of hydrogen and an alkali metal.

4. In a process for making 3-(2-cyclopentenyl)-2-methyl-4-oxo-2-cyclopentenyl chrysenthemumate the steps which include reacting cyclopentadiene with hydrogen chloride to produce 2-cyclopentenyl chloride; reacting acetoacetic ester with 2-cyclopentenyl chloride in the presence of an equivalent amount of alkali metal alcoholate to produce a lower alkyl 2-(2-cyclopentenyl)-3-ketobutyrate; subjecting the 2-(2-cyclopentenyl)-3-ketobutyrate to ketonic hydrolysis in the presence of alkali metal hydroxide to form 2-cyclopentenyl acetone; reacting the 2- cyclopentenyl acetone with diethyl carbonate in the presence of alkali metal alcoholate to form ethyl 4-(2-cyclopentenyl)-3-ketobutyrate; converting the ethyl 4-(2-cyclopentenyl)-3-ketobutyrate to the alkali metal salt and reacting it with pyruvic aldehyde to make 6-(2-cyclopentenyl)-3-hydroxyhexane-2,5-dione; treating the 6-(2-cyclopentenyl)-3-hydroxyhexane-2,5-dione with dilute alkali to convert it to 2-(2-cyclopenteyl)-3-methyl-2-cyclopenten-4-ol-1-one; and reacting the 2-(2-cyclopentenyl)-3-methyl-2-cyclopenten-4-ol-1-one with chrysanthemummonocarboxylic anhydride to form the ester thereof.

5. In a process for making an intermediate useful for the production of 3-(2-cyclopentenyl)-2-methyl-4-oxo-2-cyclopentenyl chrysanthemumate, the step which comprises heating to the reaction temperature thereof a mixture of 2-cyclopentenyl acetone and diethyl carbonate in the presence of sodium ethoxide as catalyst to produce ethyl 4-(2-cyclopentenyl)-3-ketobutyrate.

6. An insecticidal composition comprising 3-(2-cyclopentenyl)-2-methyl-4-oxo-2-cyclopentenyl chrysanthemummonocarboxylate and an inert carrier therefor.

7. The method of controlling insects which comprises applying 3-(2-cyclopentenyl)-2-methyl-4-oxo-2-cyclopentenyl chrysanthemumate to a base.

References Cited in the file of this patent

UNITED STATES PATENTS

| | | |
|---|---|---|
| 2,228,256 | Christiansen | Jan. 14, 1941 |
| 2,446,570 | Bludworth et al. | Aug. 10, 1948 |
| 2,453,619 | Byrns | Nov. 9, 1948 |
| 2,491,442 | Coleman | Dec. 13, 1949 |
| 2,506,636 | Flenner | May 9, 1950 |
| 2,510,870 | Dieter et al. | June 6, 1950 |
| 2,535,086 | Moffett et al. | Dec. 26, 1950 |
| 2,603,652 | Schechter | July 15, 1952 |
| 2,768,965 | Stansbury et al. | Oct. 30, 1956 |

OTHER REFERENCES

Richter: "Textbook of Organic Chemistry," pp. 368–9, J. Wiley (1952).

Wagner et al.: "Synthetic Organic Chemistry," p. 488, J. Wiley (1953).